(12) United States Patent
Ferrari et al.

(10) Patent No.: US 11,885,873 B2
(45) Date of Patent: Jan. 30, 2024

(54) AGRICULTURAL SYSTEM

(71) Applicant: CNH Industrial America LLC, New Holland, PA (US)

(72) Inventors: Luca Ferrari, Formigine (IT); John H. Posselius, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 630 days.

(21) Appl. No.: 16/612,470

(22) PCT Filed: May 9, 2018

(86) PCT No.: PCT/EP2018/062043
§ 371 (c)(1),
(2) Date: Nov. 11, 2019

(87) PCT Pub. No.: WO2018/206664
PCT Pub. Date: Nov. 15, 2018

(65) Prior Publication Data
US 2020/0196527 A1    Jun. 25, 2020

(30) Foreign Application Priority Data
May 9, 2017    (BE) .................................. 2017/5342

(51) Int. Cl.
*A01B 69/00* (2006.01)
*G01S 13/88* (2006.01)
(Continued)

(52) U.S. Cl.
CPC ............ *G01S 13/88* (2013.01); *A01B 69/001* (2013.01); *A01B 69/004* (2013.01); *A01D 41/1274* (2013.01); *A01D 41/1278* (2013.01); *G01S 13/06* (2013.01); *G01S 13/89* (2013.01); *G01S 15/06* (2013.01); *G01S 15/89* (2013.01); *G01S 2013/0245* (2013.01)

(58) Field of Classification Search
CPC .. A01B 69/001; A01B 69/004; A01D 41/127; A01D 41/1274; A01D 41/1278; G01S 13/06; G01S 13/88; G01S 13/89; G01S 15/06; G01S 15/88; G01S 15/89; G01S 2013/0245; G01S 2013/0254
See application file for complete search history.

(56) References Cited

U.S. PATENT DOCUMENTS 4,194,574 A * 3/1980 Benson ..................... E02F 3/76
                                                                172/430
6,377,872 B1 * 4/2002 Struckman ............. E02F 9/205
                                                                700/258
(Continued)

FOREIGN PATENT DOCUMENTS

DE    102013010491 A1    8/2014
EP    3123858 A1    2/2017

OTHER PUBLICATIONS

International Search Report and Written Opinion for Application No. PCT/EP2018/062043 dated Jul. 18, 2018 (13 pages).

*Primary Examiner* — Timothy A Brainard
(74) *Attorney, Agent, or Firm* — Peter K. Zacharias

(57) ABSTRACT

A system including a beamforming-sensor configured to acquire sensor-data representative of a swath in an agricultural field; and a controller configured to determine swath-property-data based on the sensor-data.

14 Claims, 5 Drawing Sheets

(51) Int. Cl.
*A01D 41/127* (2006.01)
*G01S 13/06* (2006.01)
*G01S 13/89* (2006.01)
*G01S 15/06* (2006.01)
*G01S 15/89* (2006.01)
G01S 13/02 (2006.01)

(56) References Cited

U.S. PATENT DOCUMENTS

| | | | |
|---|---|---|---|
| 6,389,785 B1 * | 5/2002 | Diekhans | A01B 69/008 |
| | | | 172/4.5 |
| 2010/0063690 A1 | 3/2010 | Madsen | |
| 2014/0104094 A1 * | 4/2014 | Feigin | B41J 2/04501 |
| | | | 342/22 |
| 2016/0000008 A1 * | 1/2016 | Schøler | A01D 41/1272 |
| | | | 56/10.2 R |
| 2016/0249533 A1 | 9/2016 | Byttebier et al. | |
| 2017/0013772 A1 | 1/2017 | Kirk et al. | |
| 2017/0016870 A1 * | 1/2017 | McPeek | G01S 17/89 |
| 2017/0118915 A1 * | 5/2017 | Middelberg | A01B 69/008 |
| 2018/0188366 A1 * | 7/2018 | Kemmer | A01F 15/0825 |

* cited by examiner

AGRICULTURAL SYSTEM

BACKGROUND OF THE INVENTION

Determining properties of swath that is to be collected/picked up by an agricultural vehicle, such as a baler, a forage harvester or a windrower, can be beneficial for improving the operation of swath collection.

SUMMARY OF THE INVENTION

According to a first aspect of the invention, there is provided a system comprising:
a beamforming-sensor configured to acquire sensor-data representative of swath in an agricultural field; and
a controller configured to determine swath-property-data based on the sensor-data.

Advantageously, use of a beamforming-sensor can provide highly directional sensor-data, due the inherent properties of beamforming. This can enable properties of the swath at specific locations to be accurately determined.

The beamforming-sensor may comprise a beamforming-radar-sensor. The beamforming-sensor may comprise a phased-array-radar-sensor. The beamforming-sensor may comprise a beamforming-ultrasonic-sensor.

The swath-property-data may comprise swath-area-data that is representative of a cross-sectional area of the swath.

The controller may be configured to:
process the sensor-data in order to determine:
(i) swath-profile-data, which is representative of the location of the outer-surface of the swath; and
(ii) ground-profile-data, which is representative of the location of the surface of the ground; and
process the swath-profile-data and the ground-profile-data in order to determine the swath-area-data.

The swath-property-data may comprise swath-volume-data that is representative of a volume of the swath.

The swath-property-data may comprise foreign-object-indicator-data. The controller may be configured to set the foreign-object-indicator-data as representative of a foreign object being detected if the power of a received-imaging-signal, as represented by the sensor-data, is greater than a power-threshold-level.

The swath-property-data may comprise swath-moisture-data and/or swath-density-data that is/are representative of the moisture and/or density of the swath.

The controller may be configured to set the swath-moisture-data and/or swath-density-data based on the phase and/or amplitude of the sensor-data.

The beamforming-sensor may be associated with an agricultural vehicle, and may be configured to acquire sensor-data that is representative of swath in the agricultural field in the vicinity of the agricultural vehicle.

The controller may be configured to determine vehicle-control-instructions for the agricultural vehicle, based on the swath-property-data. The vehicle-control-instructions may comprise: vehicle-steering-instructions for automatically controlling the direction of travel of the agricultural vehicle; and/or vehicle-speed-instructions for automatically controlling the speed of the agricultural vehicle.

The system may further comprise an agricultural vehicle that is configured to be operated in accordance with the vehicle-control-instructions.

The vehicle-control-instructions maybe configured to cause an output-device to provide instructions for an operator of the agricultural vehicle to set a speed and/or direction of travel of the agricultural vehicle.

There may be provided a computer program, which when run on a computer, causes the computer to configure any apparatus, including a controller, processor, machine, vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1A:
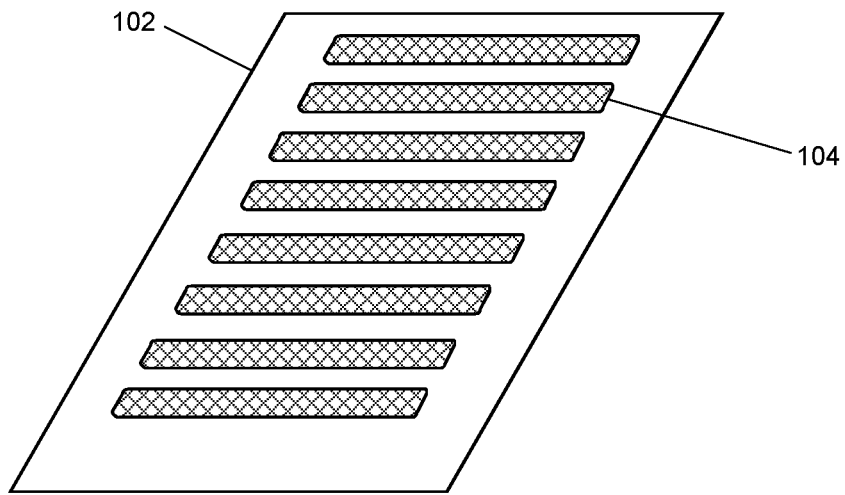
FIG. 1*a* shows an example of an agricultural field.

FIG. 1*a* shows schematically an agricultural field 102. The field 102 includes rows of crop material, which may be hay, straw or similar products that have been left in the field 102 in the form of swaths 104. The swaths 104 are elongate rows of the products in question that are heaped in the transverse centre and tend to flatten at the respective transverse edges. Typically a field 102 that has undergone harvesting contains many, essentially mutually parallel, swaths 104, as shown in FIG. 1*a*. The swaths 104 are spaced from one another by largely consistent gaps. The crop material in the swaths 104 can be picked up by an agricultural machine, such as a baler, a forage harvester or a windrower, as non-limiting examples.

Figure 1B:
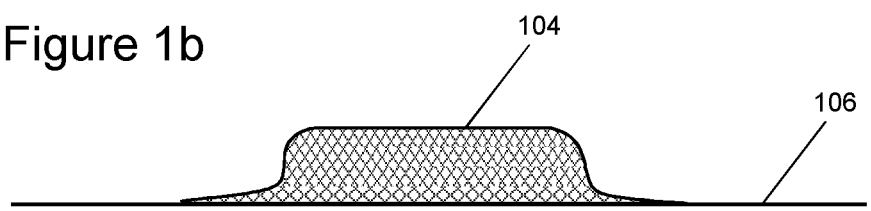
FIG. 1*b* shows schematically a cross-section of swath.

FIG. 1*b* shows schematically a cross-section of a row of swath 104, that is on the ground 106.

Figure 2:
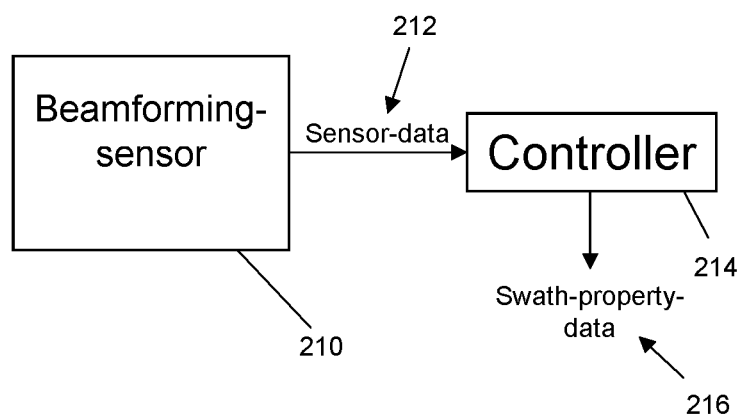
FIG. 2 shows schematically a system that is associated with determining swath-property-data.

FIG. 2 shows schematically a system for determining swath-property-data 216, which is representative of one or more properties of swath that is in a field. The system includes a beamforming-sensor 210 that can acquire sensor-data 212 that is representative of the swath in the agricultural field. As will be discussed in more detail below, the beamforming-sensor 210 may be mounted on an agricultural machine (not shown), and can be operational whilst the agricultural machine is picking up the swath from the field.

That is, the beamforming-sensor 210 may have a field of view that encompasses portions of the swath that are to be picked up.

The beamforming-sensor 210 can transmit transmitted-imaging-signals, and receive received-imaging-signals, that are reflected from an object such as the swath or the ground. Either or both of the transmitted-imaging-signals and the received-imaging-signals can be directional beamforming-signals. In some examples, providing a beamforming-sensor 210 that is configured for receiving received-beamforming-imaging-signals can be particularly advantageous.

The system also includes a controller 214 that can determine the swath-property-data 216 based on the sensor-data 212. It will be appreciated that the controller 214 can be located on the agricultural machine, or remotely from the agricultural machine. For example, the functionality of the controller 214 can be performed on a remote server, such as one "in the cloud".

Advantageously, the beamforming-sensor 210 can provide highly directional sensor-data 212 due the inherent properties of beamforming, as will be described below. This can enable properties of the swath at specific locations to be accurately determined. For example, the presence or absence of swath, and therefore the locations of the extremities of the swath, can be accurately determined. In some examples, this can be used to better control an agricultural vehicle, as will be described below.

In some examples, beamforming-sensor 210 can be provided as a beamforming-radar-sensor or a beamforming-ultrasonic-sensor. In this way, the beamforming-sensor 210 can generate electromagnetic or ultrasonic signals that are capable of penetrating obscurants, such as dust and mist, which can be present in agricultural environments. Therefore, use of a beamforming-radar-sensor or a beamforming-ultrasonic-sensor can be considered beneficial when compared with optical sensor systems. For a beamforming-radar-sensor, this can be because the beamforming-radar-sensor can use electromagnetic waves with a sufficiently long wavelength (for example radio waves or microwaves), such that there is lower scattering by the obscurants. Similarly, a beamforming-ultrasonic-sensor can use ultrasonic waves that are not significantly scattered by the obscurants. In this way, the beamforming-radar-sensor and the beamforming-ultrasonic-sensor are able to generate sensor-data 212 that is better representative of the objects of interest (including the swath and/or the ground, as will be discussed below) than is possible with optical sensors. Therefore, improved reliability can be achieved in challenging environmental conditions.

Also advantageously, the beamforming-sensor 210 can be used at night and in fog, which may not be possible or convenient with optical systems.

The sensor-data 212 can be representative of: (i) a distance to a detected object; and (ii) a direction to that detected object from the beamforming-sensor 210. The sensor-data 212 can be provided as a plurality of coordinates that are representative of the locations from which received-imaging-signals have been received, and in this example they are provided as polar coordinates.

Optionally, the sensor-data 212 can also include (iii) a power/amplitude of a received-imaging-signal; and/or (iv) a phase difference between a transmitted-imaging-signal and a corresponding received-imaging-signal. Any of the beamforming-sensors described herein can be two-dimensional or three-dimensional beamforming-sensors.

A beamforming-sensor can be implemented as a MIMO (Multiple In, Multiple Out) sensor such as a MIMO-radar-sensor, or a phased-array-sensor. The phased-array-sensor may be a phased-array-radar-sensor or a phased-array-ultrasonic-sensor. A phased-array-radar-sensor can be implemented: for beamforming signals transmitted by radar-transmit-antennae; and/or for beamforming signals received at radar-receive-antennae. (As is known in the art, the radar-transmit-antennae may be the same physical antennae as the radar-receive-antennae.)

The swath-property-data 216 may include swath-area-data that is representative of a cross-sectional area of the swath. The cross-section may be in a direction that is transverse to the longitudinal direction of an elongate row of swath, which may also be transverse to a direction of movement of the agricultural vehicle that is to pick up the swath. Such a cross-section is shown in FIG. 1b.

The swath-property-data 216 may include swath-width-data that is representative of the lateral width of the swath.

The swath-property-data 216 may include swath-height-data that is representative of the height of the swath.

The swath-property-data 216 may include swath-centre-data that is representative of the centre of the swath. The swath-centre-data may be one-dimensional, in that it can be representative of a lateral-centre of the swath (from side-to-side as the swath is shown in FIG. 1b), or a height-centre of the swath (from top-to-bottom as the swath is shown in FIG. 1b), or the swath-centre-data may be two-dimensional, in that it can be representative of both a lateral-centre of the swath and a height-centre of the swath.

The swath-property-data 216 may include swath-extremity-data that is representative of the location of the extremity of the swath. The swath-extremity-data may be one-dimensional, in that it can be representative of lateral-extremities of the swath, or height-extremities of the swath. Also, the swath-extremity-data may be two-dimensional, in that it can be representative of both lateral-extremities and height-extremities of the swath. The swath-property-data may also include swath-profile-data, which is representative of the perimeter of the swath.

The swath-property-data 216 may include swath-volume-data that is representative of a volume of the swath. Further details of one example of how the controller 214 can determine swath-area-data, and also swath-volume-data, will be described below with reference to FIG. 4.

In some examples, the swath-property-data 216 includes foreign-object-indicator-data, which is representative of whether or not a foreign object has been detected. Advantageously, through appropriate selection of the beamforming-sensor (such as a beamforming-radar-sensor that transmits radar waves with a frequency that can penetrate the swath), the sensor-data 212 can be representative of objects within the swath. That is, objects present inside the swath can provide additional reflections that are represented by the sensor-data 212. Thus, it can be possible to identify in advance the presence of foreign objects inside the swath, and appropriate actions can be taken for the agricultural vehicle before it picks up the swath containing the foreign object.

The controller 214 can set the foreign-object-indicator-data as representative of a foreign object being present if the power/amplitude of a received-radar-imaging-signal is greater than a power-threshold-level. This can be particularly useful for detecting metal foreign objects because metal objects are known to provide reflected radar signals with a high power.

Advantageously, the controller 214 can process the sensor-data 212 to detect the presence of non-ferromagnetic foreign objects. Therefore, the beamforming-sensor 210 can be used to detect objects that are not detectable by a metal detector, such as inox and alluminum objects. As will be appreciated, picking up such foreign objects can be very damaging to the agricultural machine that picks up the swath and/or any machine or person that subsequently handles the processed swath, for example in the form of a bale.

Also, the controller 214 can set the foreign-object-indicator-data as representative of a foreign object based on a distance to the detected object. In particular, based on a difference between the detected object and the distance to the ground and/or swath, as will be described below with reference to FIG. 5.

In some examples, the swath-property-data 216 can include swath-moisture-data that is representative of the moisture of the swath. The controller 214 can set the swath-moisture-data based on the phase and/or amplitude of the sensor-data 212. For instance, one or more calibration operations may be performed to determine how the moisture of the swath affects the phase and/amplitude of the received-imaging-signals, such that algorithm parameter-values can be stored in memory, or a database can be loaded with appropriate reference values. Then, when in use, the controller 214 can apply an appropriate algorithm (with the set parameter-values), or use data stored in the database, to determine the swath-moisture-data based on the received sensor-data 212.

In some examples, the swath-property-data 216 can include swath-density-data that is representative of the moisture of the swath. The controller 214 can set the swath-density-data based on the phase and/or amplitude of the sensor-data 212, in the same way as for the swath-moisture-data as discussed above.

Figure 3A:
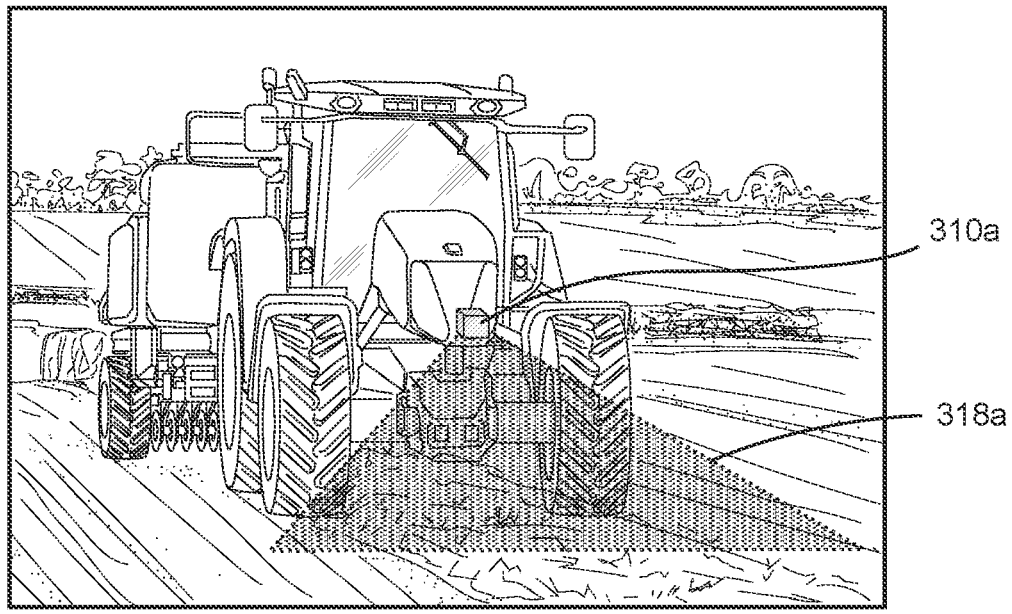
FIGS. 3*a* and 3*b* show examples of positions where a beamforming-sensor can be positioned on an agricultural vehicle.
Figure 3B:
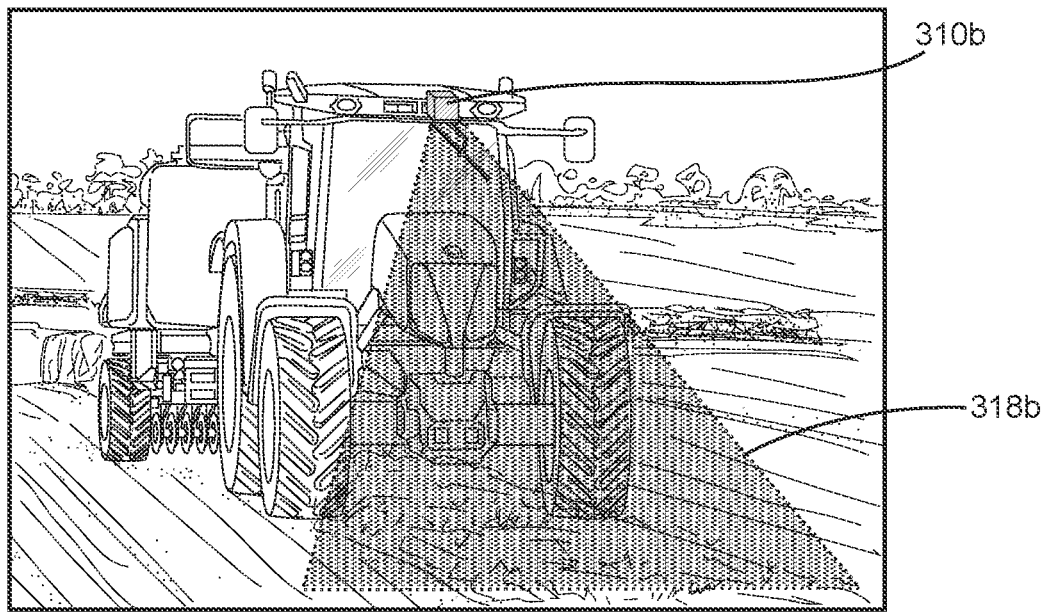

FIGS. 3a and 3b show examples of positions where a beamforming-sensor 310a, 310b can be positioned on an agricultural vehicle. In this example, the agricultural vehicle is a tractor that is towing a baler. In other examples, the agricultural vehicle can be a baler, a forage harvester, a tractor or a windrower. Any of these vehicles may or may not be self-propelled.

In FIG. 3a, the beamforming-sensor 310a is located on a lower portion of the agricultural vehicle such that it has a low field of view 318a. In FIG. 3b, the beamforming-sensor 310b is located on an upper portion of the agricultural vehicle such that it has a high field of view 318b. An advantage associated with placing the radar in an upper position, is that the field of view can be increased. However, this can involve a trade-off with decreased cross-range resolution, which is an ability to detect objects in a plane perpendicular to the wave. The cross-range resolution can depend on the angular resolution and the distance.

The beamforming-sensor can be associated with an agricultural vehicle in any way such that it acquires sensor-data that is representative of swath in the agricultural field in the vicinity of the agricultural vehicle. As shown in FIGS. 3a, and 3b, the beamforming-sensor has a field-of-view 318a, 318b that is in front of the agricultural machine (in a direction that the vehicle is moving when it picks up the swath), such that the sensor-data is representative of swath that is in front of the agricultural vehicle. In other examples, the beamforming-sensor can have a field-of-view that is to the side of the agricultural machine (in a direction that is transverse to the direction that the vehicle is moving when it picks up the swath), such that the sensor-data is representative of swath that is to the side of the agricultural vehicle. Such an example can be used to scan a parallel row of swath, that will be subsequently picked up by the agricultural vehicle. That is, the swath-property-data may be acquired for a row of swath that is different to one that is in the process of being picked up by the agricultural vehicle. This can allow planning and future control operations to be determined in advance of the agricultural machine picking up the parallel row of swath.

In some examples, the beamforming-sensor can be located on an other vehicle (not shown), which is different to the agricultural machine that is to pick up the swath, yet still can be considered to be associated with the agricultural machine. For example, because the other vehicle can be controlled such that it takes a route that is associated with the agricultural machine, or is otherwise positioned with reference to the agricultural vehicle. The other vehicle can be a manned or an unmanned vehicle, and may be a land or an aerial vehicle (an unmanned aerial can be referred to as a drone). Use of an aerial vehicle can enable sensor-data to be acquired from a beamforming-sensor at a relatively high altitude to obtain an overview of the field, thereby providing a wide field of view. Subsequently or alternatively, the aerial vehicle can stay with the agricultural vehicle at a lower altitude. For example, by flying above or ahead of the agricultural vehicle. The gathered sensor-data can be streamed to the controller and/or "the cloud".

Figure 4:
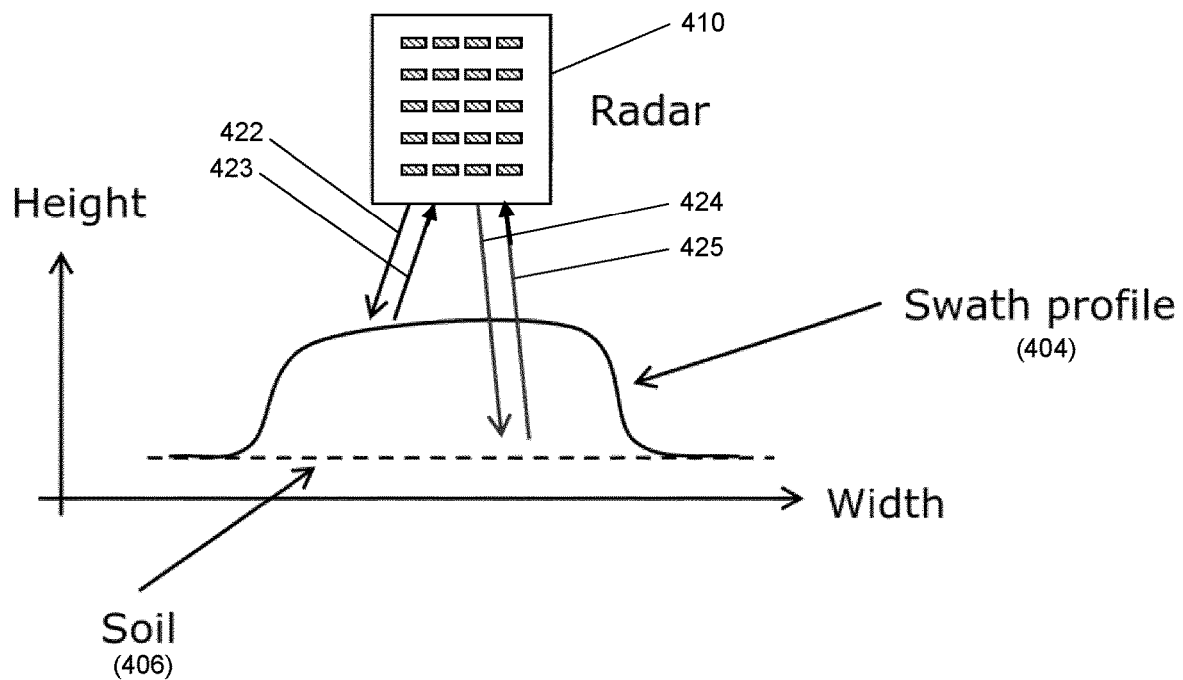
FIG. 4 shows an example of how swath can be imaged by a beamforming-radar-sensor.

FIG. 4 shows an example of a beamforming-radar-sensor 410 for acquiring sensor-data that is representative of a swath on soil. The sensor-data represents two distinct profiles: (i) a swath-profile 404 (as represented by portions of the sensor-data that can be considered as swath-profile-data), which is representative of the location of an outer-surface of the swath; and (ii) a ground-profile 406 (as represented by portions of the sensor-data that can be considered as ground-profile-data), which is representative of the location of the surface of the ground/soil. By appropriate selection of the operating frequencies of the radar signals 422, 424 the transmitted-imaging-signals can penetrate the swath. In this way, received-imaging-signals 423, 425 can be detected due to both the swath profile and the soil.

Thus, the controller can process the swath-profile-data and the ground-profile-data in order to determine swath-area-data, which is representative of a cross-sectional area of the swath. Also, in examples where a three-dimensional beamforming-radar-sensor is used, the swath-profile-data and the ground-profile data can be representative of three-dimensional profiles, and the controller can process the swath-profile-data and the ground-profile-data in order to determine swath-volume-data, which is representative of a volume of the swath.

Figure 5:
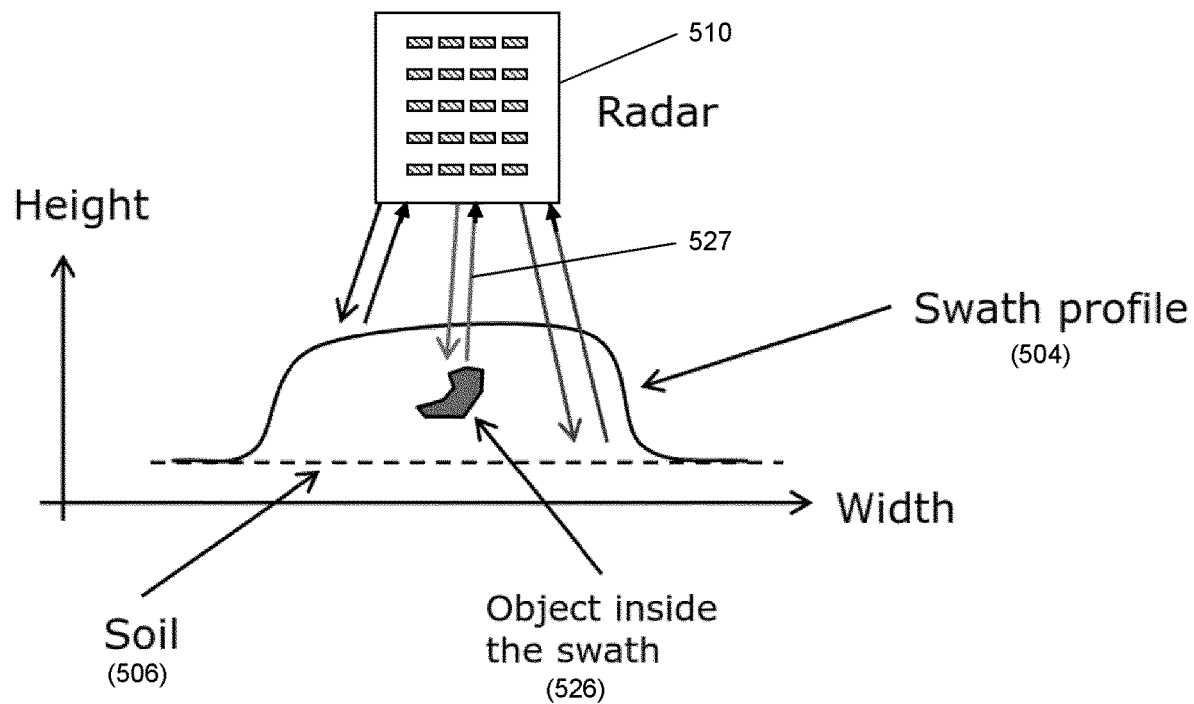
FIG. 5 shows another example of how swath can be imaged by a beamforming-radar-sensor.

FIG. 5 shows an example of a beamforming-radar-sensor 510 for acquiring sensor-data that is representative of a swath on soil, where a foreign object is located in the swath. In the same way as FIG. 4, the sensor-data represents a swath-profile 504 and a ground-profile 506. In this example, the sensor-data also includes foreign-object-data, as represented by received-imaging-signals 527 that are reflected back to the beamforming-radar-sensor 510 by a foreign object 526 within the swath. As discussed above, the controller can determine portions of the sensor-data as foreign-object-data (and therefore set foreign-object-indicator-data accordingly) if the power/amplitude of a received-imaging-signal 527 is greater than a power-threshold-level.

In some examples, the controller can determine portions of the sensor-data as foreign-object-data (and therefore set foreign-object-indicator-data accordingly) based on a distance to the detected object 526. For instance, the controller can determine a distance to the ground 506 and/or the outer surface of the swath 504 for a particular direction. The controller can associate the received-imaging-signals as associated with either the ground or the swath based on their correlation (for instance in terms of one or more of distance/power/phase) with received-imaging-signals received in other directions. Then, if the sensor-data also includes a received-imaging-signal 527 that is not sufficiently correlated with the swath-profile-data or the ground-profile-data, then the controller may determine that the received-imaging-signal 527 is associated with a foreign object. In one example, the received-imaging-signal 527 may be considered not sufficiently correlated with the swath-profile-data or the ground-profile-data if it represents a reflection from an object that is more than a threshold distance away from the swath-profile 504 and/or the ground-profile 506.

In some examples, the controller can apply different power-threshold-levels to determine whether or not to classify the detected object as a foreign object. For example, if the received-imaging-signal 527 is representative of a reflection from an object that is:

less than a threshold distance away from the swath-profile 504 or the ground-profile 506, then the controller may compare the power of the received-imaging-signal 527 with a first-power-threshold; and greater than a threshold distance away from the swath-profile 504 and/or the ground-profile 506, then the controller may compare the power of the received-imaging-signal 527 with a second-power-threshold.

The second-power-threshold (applied when the potential foreign object is not near the outside of the swath) may be lower than the first-power-threshold, on the basis that it is less likely that the received-imaging-signal 527 is from a discontinuity in the surface of the swath or the ground.

Figure 6:
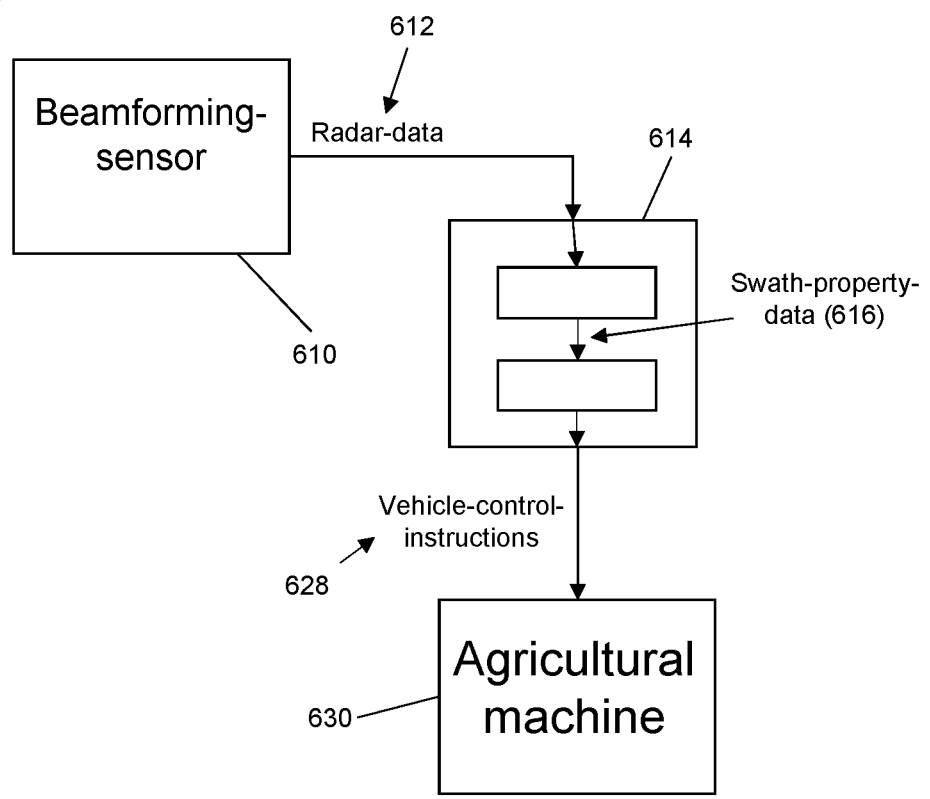
FIG. 6 shows schematically a system that can determine vehicle-control-instructions for an agricultural vehicle based on swath-property-data.

FIG. 6 shows schematically a system that can determine vehicle-control-instructions 628 for an agricultural vehicle 630 based on swath-property-data 616.

The system includes a beamforming-sensor 610, which can be any radar beamforming-sensor described herein. The beamforming-sensor 610 provides sensor-data 612 to a controller 614. The controller 614 processes the sensor-data 612 and determines swath-property-data 616, which can be any type of swath-property-data 616 described herein. The controller 614 also processes the swath-property-data 616 in order to determine vehicle-control-instructions 628 for the agricultural machine 630. As discussed above, the agricultural machine 630 can be a baler, a forage harvester, a tractor or a windrower, and may or may not be self-propelled, as non-limiting examples.

The vehicle-control-instructions 628 can include vehicle-steering-instructions for automatically controlling the direction of travel of the agricultural machine 630. In this way, if the controller 614 determines that the agricultural machine 630 is not centralised on the swath (for example by identifying an offset between (i) the lateral centre of the swath, as defined by swath-centre-data for example, and (ii) the lateral centre of a pick-up/header of the agricultural machine 630), then the controller 614 can provide vehicle-control-instructions 628 that cause the steering of the agricultural machine 630 to be adjusted in order to centralise the agricultural vehicle 630 with reference to the swath (for example to reduce the offset). In some examples, the controller 614 can determine the centre of a pick-up/header of the agricultural machine 630 and/or the offset, by utilising a known relationship between the field of view of the beamforming-sensor 610 and the centre of a pick-up/header of the agricultural machine 630. For instance, the lateral centre of the field of view of the beamforming-sensor 610 may correspond with the lateral centre of the pick-up/header of the agricultural machine 630.

In this way, the agricultural machine 630 can be autonomously controlled such that it picks up the swath in an improved way, for example a way that results in less of the swath being wasted/missed. That is, swath guidance can be provided, for example by identifying the swath profile.

The vehicle-control-instructions 628 can also or alternatively include vehicle-speed-instructions for automatically controlling the speed of the agricultural machine 630. For instance, the controller 614 can determine crop-area-data or crop-volume-data (as the swath-property-data 616) and provide vehicle-speed-instructions based on the crop-area-data or crop-volume-data. In one example, the controller 614 can provide vehicle-speed-instructions for automatically increasing the speed of the agricultural machine 630 when the sensor-data 612 is representative of a decreasing value for the crop-area-data or crop-volume-data, and vice versa. In some examples, the controller 614 can apply an algorithm to the crop-area-data or crop-volume-data in order to determine the vehicle-speed-instructions. In other examples, the controller 614 can use a database or look-up-table to determine the vehicle-speed-instructions based on the crop-area-data or crop-volume-data.

In this way, feed-forward control of the speed of the agricultural vehicle 630 (which may be a tractor that is towing a baler) can be performed, for example based on the volume or cross-sectional area of the swath.

In some examples, the controller 614 can determine vehicle-control-instructions 628 based on foreign-object-indicator-data (which is an example of swath-property-data 616). For instance, the controller 614 can determine vehicle-speed-instructions for automatically stopping the agricultural vehicle 630 in advance of the detected foreign object. In some examples, the controller 614 can also cause an output-device (such as a display or an audio device) to provide information to an operator of the agricultural vehicle 630 that is representative of the detected foreign object. For example, its location in the swath or its size, or any other information that will assist the operator in removing the foreign object.

In some examples, the controller 614 can determine vehicle-steering-instructions for automatically steering the agricultural vehicle 630 around the detected foreign object. Also, in some examples, the controller 614 can determine vehicle-pick-up-instructions for automatically controlling a pick-up/header of the agricultural machine 630 such that it does not pick up the swath in the vicinity of the foreign object. For instance, the vehicle-pick-up-instructions may automatically control a pick-up/header such that it is raised (or the agricultural vehicle 630 is otherwise put in a non-pick-up-mode) in advance of the detected foreign object; and subsequently lowered (or the agricultural vehicle 630 is otherwise placed in a pick-up-mode) after the detected foreign object.

In some examples the vehicle-control-instructions 628 can cause an output-device (such as a display or audio device in the cab of the agricultural vehicle 630) to provide instructions for an operator of the agricultural vehicle 630 to set a speed and/or direction of travel of the agricultural vehicle 630.

In this way, foreign object detection (such as stones or metallic objects) can be performed before the foreign object is harvested. This can be especially useful for self-propelled forage harvesters, where inox or alluminum objects may not be detected by metal detection systems. It can be particularly advantageous to detect such foreign objects before they are harvested because it can be much quicker and easier for an operator of the agricultural machine to remove the foreign object from the swath, as opposed to from inside the agricultural machine. Therefore, this can result in the crop harvesting operation being much more efficient than would be the case if the foreign object were taken into the agricultural machine 630.

Figure 7:
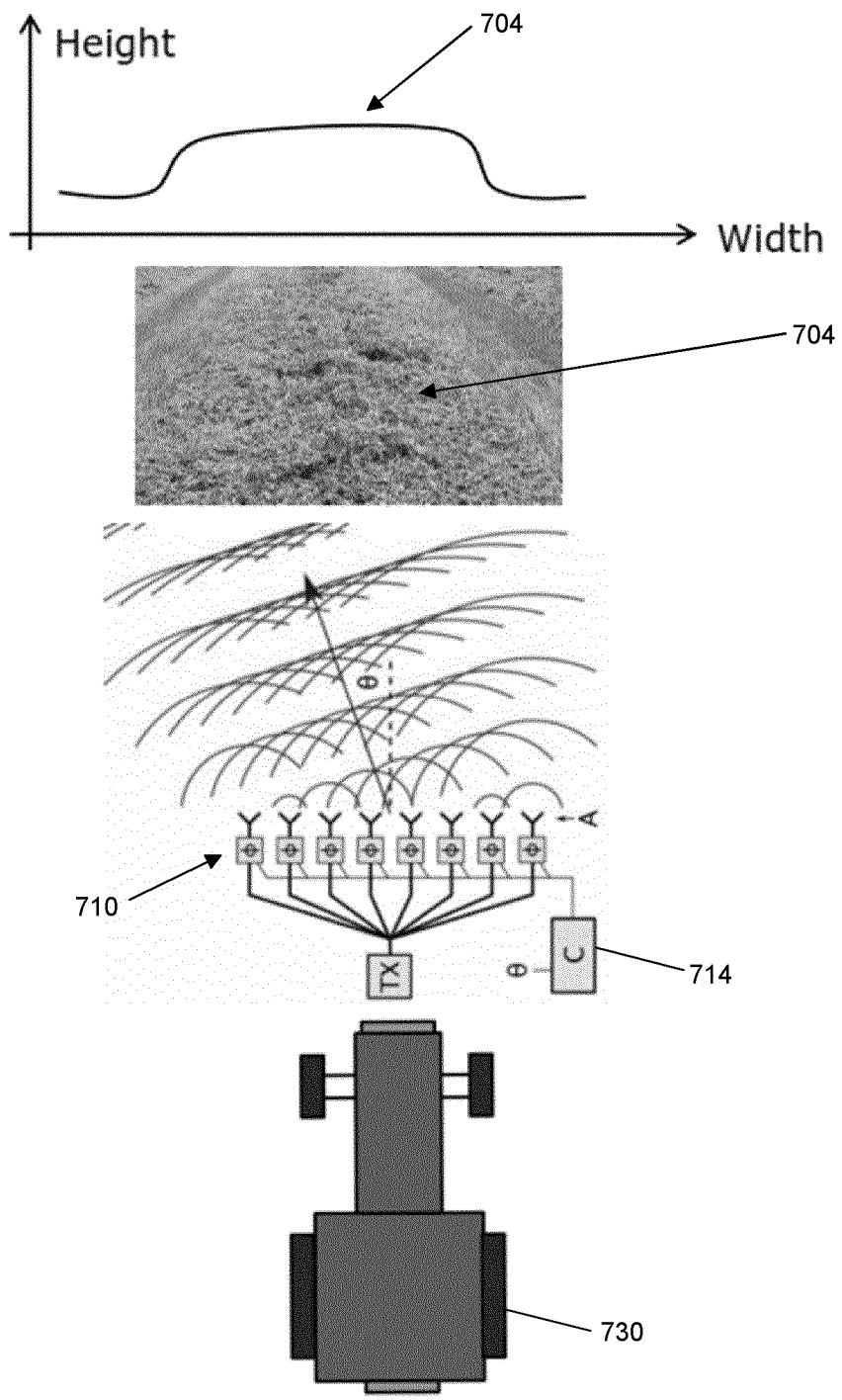
FIG. 7 shows another example of how swath can be imaged by a phased-array-radar-sensor.

FIG. 7 shows another example of how swath 704 can be imaged by a phased-array-radar-sensor 710.

The phased-array-radar-sensor 710 is associated with an agricultural vehicle, which in this example is a tractor 730. The phased-array-radar-sensor 710 includes a plurality of antennae, that: (i) transmit signals are phase-shifted with respect to each other before being provided to the transmit-antennae, such that overall they constructively combine in a particular direction; and/or (ii) received signals are phase-shifted with respect to each other, such that overall they constructively combine in a particular direction. The phase shift of the transmit and/or receive signals are controlled by a controller 714 such that a particular direction of θ is achieved. The controller 714 may be the same as, or different to, the controller that determines the swath-property-data (not shown in FIG. 7).

In this way, a beamforming technique can be used to scan a surface, and therefore acquire swath-profile-data and ground-profile-data (as examples of surface-profile-data), as discussed above. A beamforming technique can be considered as an ability to drive each antenna/microphone of an antenna/microphone array with a different signal phase. In this way, it is possible to have a microwave/ultrasonic beam with a high directivity, because it is possible to change the interference between the different signals generated by each antenna/microphone. By using a beamforming technique, it can be possible to focus the beam (for either transmit or receive, or both) on a plurality of points, possibly every specific point, in a field-of-view of the beamforming-sensor 710 so that the controller can evaluate the reflection of each point and identify the position of the swath.

It will be appreciated from the above description that by proper post-processing of the sensor-data, it can be possible to understand the distance related to each reflection and angles of arrival. Furthermore, by processing the shape of a received-imaging-signal, such as a radar signal waveform (e.g. amplitude, phase), a controller can determine physical and/or chemical information about the swath (e.g. density, moisture).

It will be appreciated that any of the control operations disclosed herein, such as setting the speed or direction of travel of the baler or an associated tractor, can be performed by comparing data with one or more threshold values, applying an algorithm to data, or using a look-up-table/database to determine a control value based on received/determined data.

The invention claimed is:

1. A system comprising:
a beamforming-sensor configured to acquire sensor-data representative of a swath in an agricultural field; and
a controller configured to determine foreign-object-indicator-data based on the sensor-data when the sensor-data is not correlated with swath-profile-data or ground-profile-data, the foreign object positioned within the swath or the ground below the swath,
wherein the beamforming-sensor is configured to acquire sensor-data that is representative of the swath in the agricultural field in a vicinity of an agricultural vehicle,
wherein the controller is further configured to determine vehicle-control-instructions for the agricultural vehicle, based on the swath-property-data, the swath-property-data including crop- area-data or crop-volume-data,
wherein the vehicle-control-instructions comprise:
vehicle-steering-instructions for automatically controlling a direction of travel of the agricultural vehicle; and
vehicle-speed-instructions for automatically stopping the agricultural vehicle based on a detection of a foreign object within the foreign-object-indicator-data.

2. The system of claim 1, wherein the beamforming-sensor comprises a beamforming-radar-sensor.

3. The system of claim 2, wherein the beamforming-sensor comprises a phased-array-radar-sensor.

4. The system of claim 1, wherein the beamforming-sensor comprises a beamforming-ultrasonic-sensor.

5. The system of claim 1, wherein the swath-property-data comprises swath-area-data that is representative of a cross-sectional area of the swath.

6. The system of claim 5, wherein the controller is further configured to:
process the sensor-data in order to determine:
swath-profile-data, which is representative of a location of an outer-surface of the swath; and
ground-profile-data, which is representative of a location of a surface of the ground; and
process the swath-profile-data and the ground-profile-data in order to determine the swath-area-data.

7. The system of claim 1, wherein the swath-property-data comprises swath-volume-data that is representative of a volume of the swath.

8. The system of claim 1, wherein the controller is further configured to set the foreign-object-indicator-data as representative of a foreign object being detected if a power of a received-imaging-signal, as represented by the sensor-data, is greater than a power-threshold-level.

9. The system of claim 1, wherein the swath-property-data comprises swath-moisture-data or swath-density-data that is representative of a moisture or density of the swath.

10. The system of claim 9, wherein the controller is further configured to set the swath-moisture-data or swath-density-data based on the phase or amplitude of the sensor-data.

11. The system of claim 1, further comprising an agricultural vehicle that is configured to be operated in accordance with the vehicle-control-instructions.

12. A system comprising:
a beamforming-sensor configured to acquire sensor-data representative of a swath in an agricultural field, the beamforming-sensor configured to acquire sensor-data that is representative of the swath in the agricultural field in a vicinity of an agricultural vehicle; and
a controller operably coupled with the beamforming-sensor, the controller configured to:
determine swath-property-data based on the sensor-data, the swath-property-data including foreign-object-indicator-data;
determine a positional relationship of a header of an agricultural machine relative to the swath by utilizing, a relationship between a field of view of the beamforming- sensor and a defined position of the header: and
provide vehicle-control-instructions that cause the steering of an agricultural machine to be adjusted with reference to the swath to reduce the offset in the positional relationship.

13. The system of claim 12, wherein the controller is further configured to:

set the foreign-object-indicator-data as representative of a foreign object being detected if a power of a received-imaging-signal, as represented by the sensor-data, is greater than a power-threshold-level and within a threshold distance from a swath profile of the swath.

14. A system comprising:
a beamforming-sensor configured to acquire sensor-data representative of a swath in an agricultural field; and
a controller operably coupled with the beamforming-sensor, the controller configured to:
  receive swath-property-data based on the sensor-data, the swath-property-data including swath-moisture-data that is representative of a moisture of the swath;
  determine a moisture of the swath-moisture-data; and
  perform one or more calibration operations based on the moisture of the swath-moisture-data, wherein the moisture affects a phase or an amplitude of the swath-moisture-data.

* * * * *